US012615494B2

(12) United States Patent
Hoelzle et al.

(10) Patent No.: US 12,615,494 B2
(45) Date of Patent: Apr. 28, 2026

(54) COMMUNICATION CHANNEL ENCODING/TAGGING MESSAGES IN A TELECOMMUNICATIONS NETWORK

(71) Applicant: T-Mobile USA, Inc., Bellevue, WA (US)

(72) Inventors: Sean P. Hoelzle, Collegeville, PA (US); Ayman Zaki, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 18/490,716

(22) Filed: Oct. 19, 2023

(65) Prior Publication Data

US 2025/0133373 A1    Apr. 24, 2025

(51) Int. Cl.
*H04W 4/14*          (2009.01)

(52) U.S. Cl.
CPC ..................................... *H04W 4/14* (2013.01)

(58) Field of Classification Search
CPC .......... H04W 4/14; H04W 4/18; H04L 51/04; H04L 51/06; H04L 51/58
USPC .................... 370/329; 455/414.1–414.4, 466
See application file for complete search history.

(56) References Cited

U.S. PATENT DOCUMENTS 8,467,816 B2    6/2013   Celik et al.
9,560,495 B2    1/2017   Appelman

| 2008/0039121 A1 | 2/2008 | Muller et al. | |
| 2014/0194151 A1* | 7/2014 | Bengtsson | H04L 51/04 |
| | | | 455/466 |
| 2015/0208213 A1* | 7/2015 | Nieuwenhius | H04W 8/02 |
| | | | 455/466 |
| 2023/0308404 A1* | 9/2023 | Thompson | H04L 51/046 |

FOREIGN PATENT DOCUMENTS

| CN | 106464611 B | 11/2019 |
| EP | 2002363 B1 | 8/2013 |

* cited by examiner

*Primary Examiner* — Michael Y Mapa
(74) *Attorney, Agent, or Firm* — Perkins Coie LLP

(57)          ABSTRACT

The invention relates to using a message modification attribute value to indicate restrictions on lines of communication that may be used for a particular device. In some aspects, a network node of a telecommunications network receives a request to deliver a SMS message from a first mobile device to a second mobile device. The network node determines that the first mobile device is eligible to receive SMS messages but not instant messages. Therefore, the network node generates a message modification attribute value indicating the communication channel via which messages are to be delivered to the first mobile device. The network node sends the SMS message to the second mobile device modified by the message modification attribute value. The second mobile device receives the message and, based on the message modification attribute value, acknowledges to use SMS communication with the first mobile device for a first duration of time.

20 Claims, 5 Drawing Sheets

500

COMMUNICATION CHANNEL ENCODING/TAGGING MESSAGES IN A TELECOMMUNICATIONS NETWORK

BACKGROUND

A cellular network or mobile network is a telecommunications network where the link to and from end nodes is wireless and the network is distributed over land areas called cells, each served by at least one fixed-location transceiver (typically three cell sites or base transceiver stations). These base stations provide the cell with the network coverage which can be used for transmission of voice, data, and other types of content. When joined together, these cells provide radio coverage over a wide geographic area. This enables numerous types of devices to communicate with each other and with fixed transceivers and telephones anywhere in the network, via base stations or telecommunications network nodes.

Mobile devices are sometimes connected to networks ineligible for certain forms of communication, due to network bandwidth limitations or incompatibilities with certain features.

BRIEF DESCRIPTION OF THE DRAWINGS

Detailed descriptions of implementations of the present invention will be described and explained through the use of the accompanying drawings.

Figure 1:
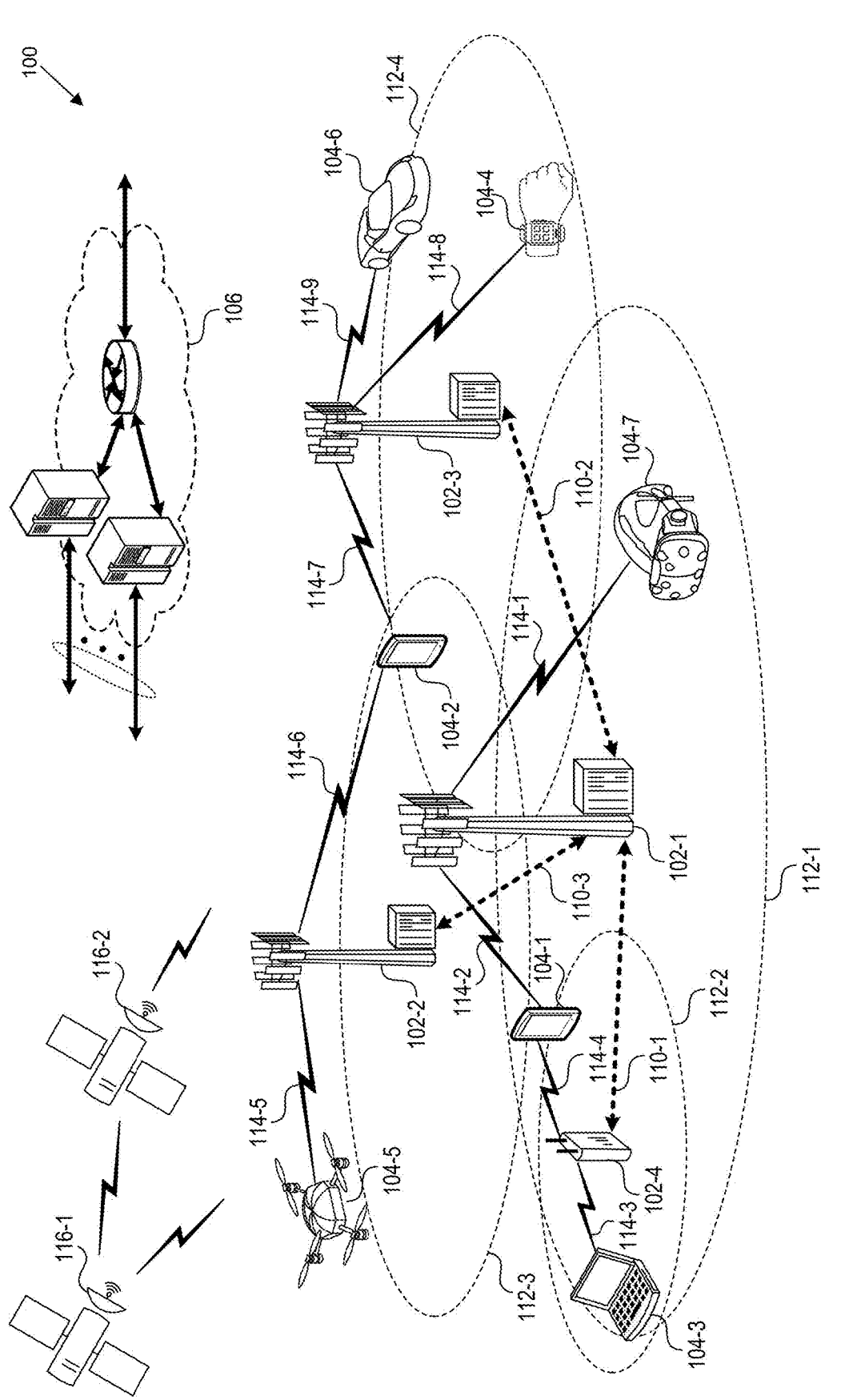
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Currently, mobile devices communicating on a telecommunications network do not automatically gauge whether cellular data-based instant messaging or SMS messaging is most suitable for a line of communication. For example, a first user of a first mobile device may attempt to send a message to a second device belonging to a second user. The first user is in a non-terrestrial PLMN such as a satellite network, and is therefore eligible to send and receive only SMS communications. The first user is unable to use, for example, RCS communications, instant messaging or other wireless network-based lines of communication. However, the second user nor the second mobile device may be aware of this limitation, even upon receipt of an SMS message. That can cause undelivered messages from the second user or second mobile device to the first mobile device and unnecessarily contributes friction to communication.

To that end, the invention herein determines that the first device is only accessible using an SMS communication channel and modifies the SMS message using a generated message modification attribute value. The modification attribute value may indicate to the second device that SMS communication must be used with the first device for a period of time. This allows minimal disruption to communication due to network factors.

The disclosed technology can use a message modification attribute value to indicate restrictions on lines of communication that may be used for a particular device. For example, a network node of a telecommunications network receives a request to deliver a SMS (or MMS) message from a first mobile device to a second mobile device. The network node determines that the first mobile device is eligible to receive SMS messages but not instant messages. Therefore, the network node generates a message modification attribute value indicating the communication channel via which messages are to be delivered to the first mobile device. The network node sends the SMS message to the second mobile device modified by the message modification attribute value. The second mobile device receives the message and, based on the message modification attribute value, acknowledges to use SMS communication with the first mobile device for a first duration of time.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
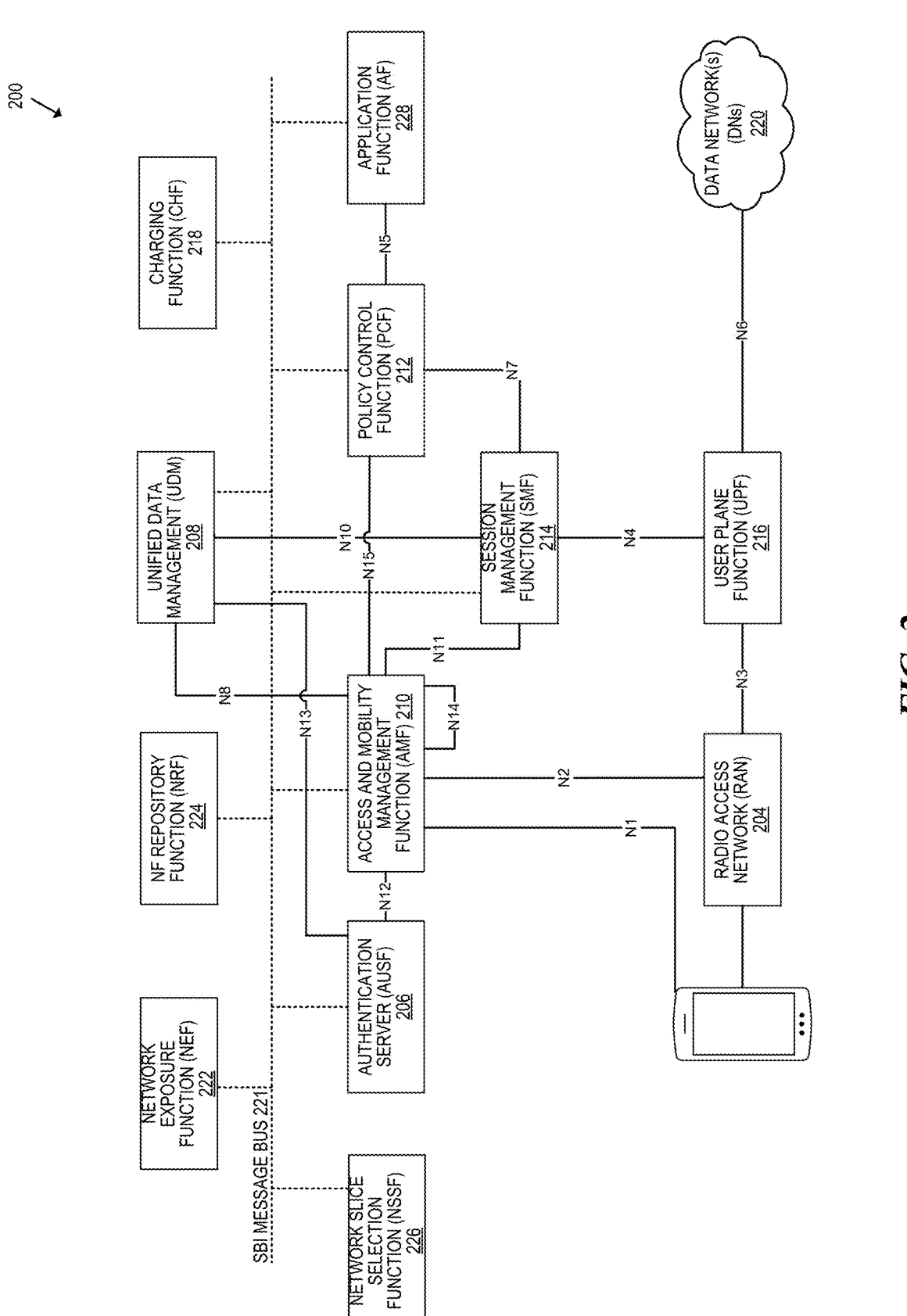
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Figure 3:
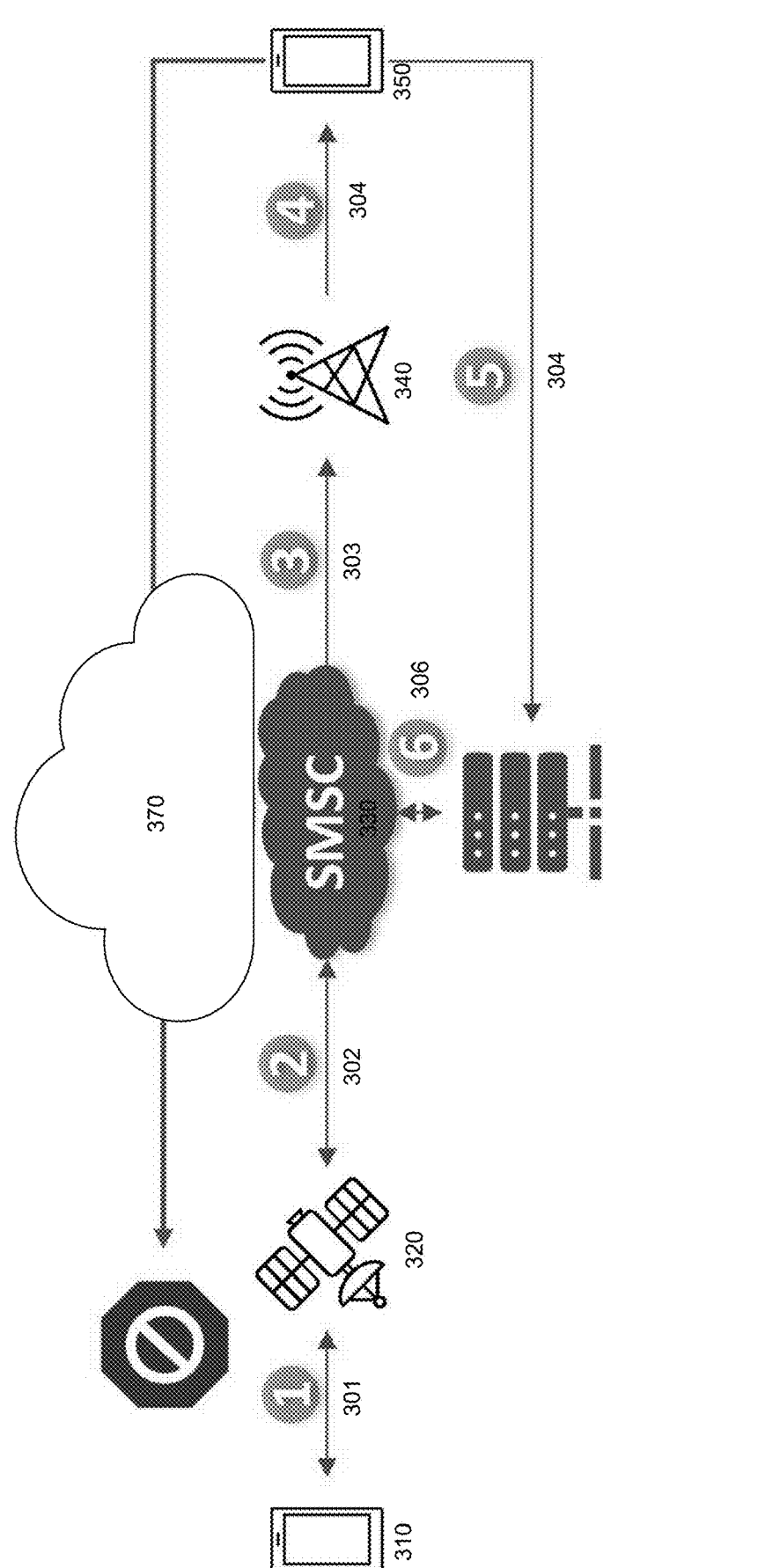
FIG. 3 is a flow diagram that illustrates components of a communication network and shows the operations performed by some implementations of the present technology.

FIG. 3 is a flow diagram indicating a telecommunications network node modifying a text message from a first mobile device to a second mobile device. For example, the telecommunications network node receives a request to deliver an SMS message from a first mobile device on a non-terrestrial public land mobile network (PLMN) to a second mobile device. The telecommunications network node uses a message modification attribute value to modify the SMS or MMS message, and transmits the message to the second device to cause further communications between the mobile devices to be transmitted via SMS or MMS. The message modification attribute value indicates a length of time during which the communications between the two mobile devices are to be through SMS or MMS messaging instead of alternatives such as RCS or instant messaging.

For example, a first user of a first mobile device may attempt to send a message to a second device belonging to a second user. The first user is in a non-terrestrial PLMN, and is therefore able to send and receive only SMS communications. The first device is unable to use, for example, RCS communications, instant messaging or other wireless network-based lines of communication. However, the second user/device may not be aware of this limitation of the first device, even upon receipt of an SMS message. To that end, the invention herein determines that the first device is only accessible using a SMS communication channel and modifies the originating SMS message using a generated message modification attribute value. The modification attribute value may indicate to the second device that only SMS communication is to be used with the first device for a period of time.

For the following descriptions, while the illustrated implementation shows a mobile device, the invention can also apply to other types of wireless devices such as wireless devices 104 discussed above. At Operation 301 of an example embodiment, First Mobile Device 310 communicates via Satellite 320 to send the contents for a message intended for Second Device 350. First Mobile Device 310 may not be aware of its inability to receive RCS communications or instant messaging, but Satellite 320 may determine that its non-terrestrial PLMN, which First Mobile Device 310 depends on for communication, only allows SMS communication. For example, any instant messaging communication or RCS communication through Cloud 370 will not reach First Mobile Device 310. Cloud 370 may include all communication channels over the Internet, for example. Cloud 370 may require a connection to the Internet or a service other than cellular service. Devices such as Second Mobile Device 350 may attempt to communicate via one or more services in Cloud 370, unaware that First Mobile Device 310 is unable to receive messages through Cloud 370 and must instead rely on SMS communication only. The restriction to receiving SMS communication only may be location-based or time-based, or be imposed in response to high network traffic and resource rebalancing priorities. For example, the user of First Mobile Device 310 can impose the limitation to SMS and MMS communication for as long as First Mobile Device 310 is within a geofence area. Alternatively, the user of First Mobile Device 310 can anticipate an internet outage for a fixed period of time and thus wish to resort to SMS and MMS communication for that period of time. A network node or other telecommunications network component may determine that network traffic cannot handle requests for instant messaging or RCS messaging for First Mobile Device 310, for example due to insufficient bandwidth in a region. All the above may be reasons to impose SMS and MMS limits on communication with First Mobile Device 310. In some embodiments, First Mobile Device 310 indicates an inability or unwillingness to send or receive RCS communications or other instant messaging, for example due to user input. A user of First Mobile Device 310 may wish to conserve mobile data, or know that the internet connection of First Mobile Device 310 is unreliable. Alternatively, the user of First Mobile Device 310 may consider an RCS mobile application dysfunctional or undesirable, temporarily or permanently. Thus, the user of First Mobile Device 310 may prefer SMS or MMS messages for communication with other user devices. First Mobile Device 310 can thus communicate with Satellite 320 to initiate the modification of an originating SMS message. First Mobile Device 210 can transmit metadata regarding the SMS message to Satellite 320 or SMSC 330 in conjunction with (or in parallel with) the SMS message. In some embodiments, First Mobile Device 310 is limited to MMS messages instead of SMS communication, due to network connectivity restrictions or user input. First Mobile Device 310 can send the MMS message or transmit metadata regarding the MMS message to Satellite 320 or a MMSC in lieu of SMSC 330.

At Operation 302 of the above example, Satellite 320 transmits the SMS message to SMSC 330, a telecommunications network node. The SMSC 330 generates a message modification attribute value indicating a communication channel. In this example, the message modification attribute value is a TP-PID value indicating a first duration of time in which to use SMS communication with First Mobile Device 310. For example, the message modification attribute value alters specific bits in an 8-bit TP-PID value of a SMS message. In another example, the message modification attribute value sets the TP-PID value to a real number indicative of the length of time for which to enforce SMS communication. In another example, Satellite 320 transmits a MMS message to a MMSC, and the message modification attribute value is an X-MMS-Message-Class representing a length of time. The length of time can be determined by a user profile for the first mobile device indicating a user preference associated with the first mobile device. The user profile can indicate an expected length of time during which internet access is not dependable enough to use instant messaging. The user profile can also indicate a preference by the user to use SMS communication or MMS communication, for example to conserve data usage. In another example, a length of the first duration of time is determined based on a user profile for the second mobile device indicating a user preference associated with the second mobile device. The user of Second Mobile Device 350 may indicate their preference for ending SMS/MMS communication after a period of time. In another example, a length of the first duration of time is based on a location of the first mobile device when requesting to deliver the first message. For example, SMSC 330 (or MMSC) may recognize, through metadata associated with the message such as an encoding for the originating PLMN for First Mobile Device 310, that First Mobile Device 310 is in a remote area estimated to be several days from the closest network coverage for instant messaging. Consequently, SMSC 330 sets the length of the first duration of time to be a number of hours/days. The length of the first duration of time can also be determined based on a messaging history between the first mobile device and the second mobile device. For example, SMSC 330 retrieves the last occurrence of SMS or MMS communication between the mobile devices, determines a length of time for the last occurrence, and sets the length for the first duration of time to be that length (or a derivative thereof). In some embodiments, a length of the first duration of time is determined based on a machine learning model processing the first line of communication and first metadata associated with recent communications between the first mobile device and the second mobile device. The machine learning model uses algorithms such as neural networks or random forests to generate a quantitative output comprising the length of time for the first duration of time.

SMSC 330 may tag a message with a communication channel value indicating a length of time during which SMS and/or MMS communication is to be used instead of instant messaging. For example, a SMS message can be assigned a TP-PID value, which symbolizes a length of time during which SMS communication is to be used. More details on TP-PID values being used for this purpose can be found below in the description of FIG. 4. Similarly, a MMS message can be assigned a X-MMS-Message-Class by a MMSC, the X-MMS-Message-Class indicating a length of time during which SMS communication is to be used. At Operation 303 of the example, SMSC 330 may transmit the modified message to Telecommunications Network Node 340. Network node 340 may be a cell tower, or other entity on a telecommunications network capable of transmitting and receiving SMS or MMS messages. At Operation 304, Telecommunications Network Node 340 can then transmit the modified SMS or MMS message to Second Mobile Device 350.

During the first duration of time, SMSC 330 may detect a request to send an instant message, for example an RCS message, from First Mobile Device 310 to any recipient. Alternatively, SMSC 330 may detect that First Mobile Device 310 is connected to a network eligible for receiving instant messaging communications and has left the nonterrestrial PLMN. For example, SMSC 330 may detect that First Mobile Device 310 is now in communication with Cloud 370. In response to such a detection, SMSC 330 can choose to terminate the first duration of time and indicate to Second Mobile Device 350, for example through Telecommunications Network Node 340, that it may resume instant messaging communications with the First Mobile Device 310, for example through Cloud 370. In some implementations, SMSC 330 immediately terminates the first period of time when detecting that First Mobile Device 310 is eligible for instant messaging. In other implementations SMSC 330 determines a second period of time to supplant the first period of time. The second period of time is shorter than the first period of time and is designed to allow for a margin of error and determine that First Mobile Device 310 is eligible for instant messaging with confidence. The length of the second period of time may vary with the confidence of SMSC 330 that First Mobile Device 310 is connected to Cloud 370 or is otherwise eligible for instant messaging. SMSC 330 can use a machine learning model to determine a length of the second period of time. after the end of the second period of time, SMSC 330 alerts Second Mobile Device 350 to use instant messaging with First Mobile Device 310.

While the first duration of time is active, Second Mobile Device 350 communicates directly with SMSC 330 using SMS communication in lieu of instant messaging, as shown by Operation 305 and Operation 306 of the example. In some other examples, Second Mobile Device 350 uses MMS communication through a MMSC to send MMS messages to First Mobile Device 310. One or more software applications or settings on Second Mobile Device 350 may cause it to route any messages to First Mobile Device 310 to be SMS or MMS messages. In some embodiments, Second Mobile Device 350 attempts to send instant messaging to First Mobile Device 310 using RCS. Second Mobile Device 350 may thus receive a notification indicating a failure to deliver the message. In response to the notification, Second Mobile Device 350 may activate the first duration of time, for example based on user profile settings on Second Mobile Device 350. In this example, subsequent messages from Second Mobile Device 350 to First Mobile Device 310 are SMS messages. In other implementations, SMSC 330 communicates with Telecommunications Network Node 340 in Operation 303 to indicate the first duration of time, and Telecommunications Network Node 340 in turn indicates to Second Mobile Device 350 in Operation 304 that only SMS or MMS communications ought to be used with First Mobile Device 310. Second Mobile Device 350 correspondingly activates the first duration of time for the specified length as indicated by Telecommunications Network Node 340. During the first duration of time, SMS messages sent from Second Mobile Device 350 to SMSC 330, for example through telecommunications network node 340, may be transmitted from SMSC 330 to Satellite 320, where it is then delivered to First Mobile Device 310. MMS messages may be sent from Second Mobile Device 250 to a MMSC and similarly transmitted to Satellite 320 and then delivered to First Mobile Device 310.

In some embodiments, the telecommunications network node is a MMSC (multimedia messaging service center) instead of a short messaging service center. The MMSC can still be referred to as SMSC 330, and can perform the same operations as described above. The MMSC can receive, store, modify, route, and forward MMS messages from mobile devices. The MMSC can generate a message modification attribute value indicating a length of time during which to use MMS communication in lieu of instant messaging between First Mobile Device 310 and Second Mobile Device 350. The MMSC can determine a length of time for the duration of MMS communication and assign the MMS message to a message modification attribute value such as a X-MMS-Message-Class. The X-MMS-Message Class can take on a real value symbolizing the length of time during which to use MMS communication. The MMSC then transmits the MMS message to the receiving device with the X-MMS-Message-Class as a value included in the MM1 notification sent to the receiving device, such as Second Mobile Device 350. Second Mobile Device 350 thus uses the X-MMS-Message-Class to determine a length of time during which to send MMS messages instead of RCS or instant messages to First Mobile Device 310.

Figure 4:
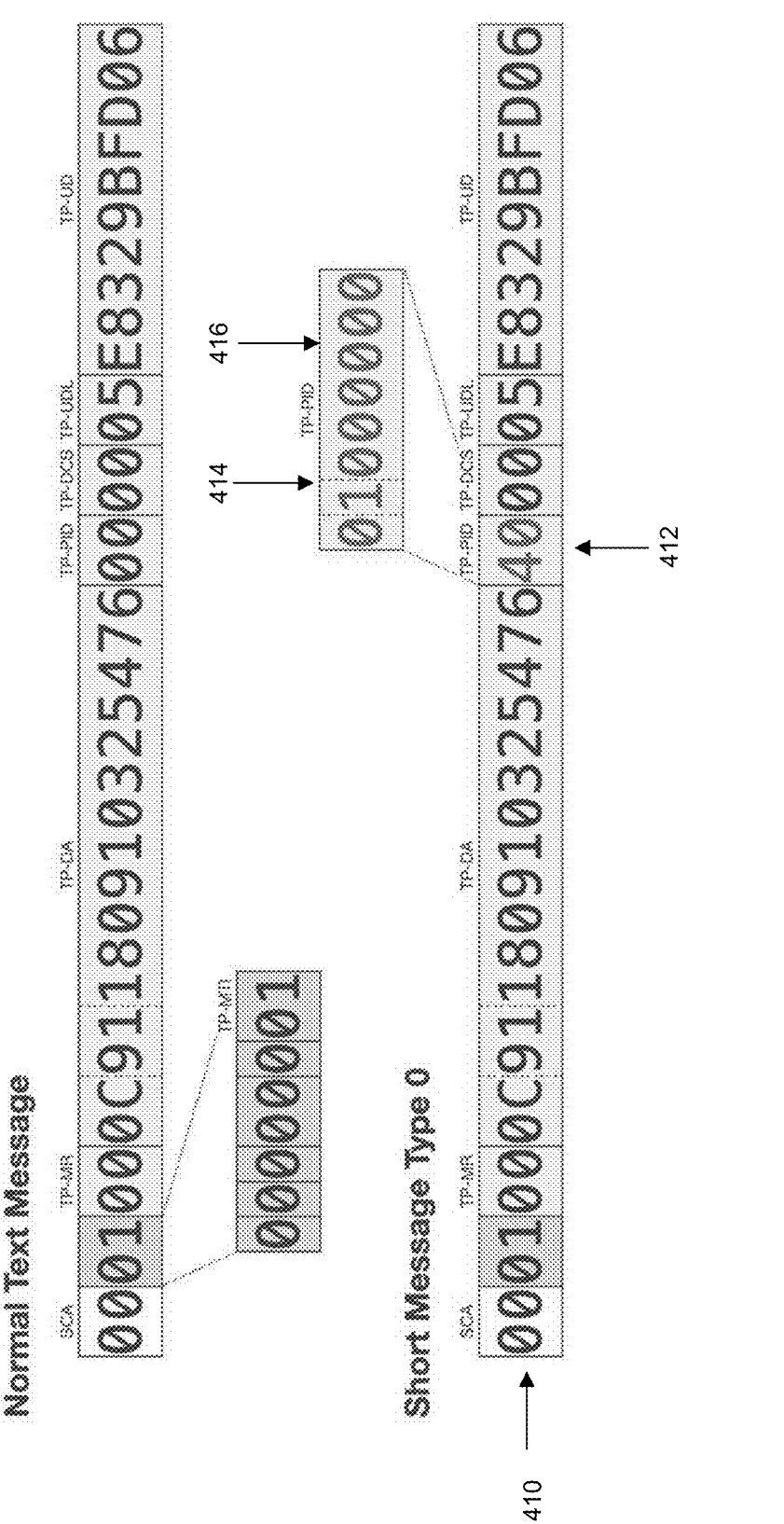
FIG. 4 shows components of an SMS message, exemplary of the communications processed by the invention.

FIG. 4 shows components of an SMS message of the same type sent from First Mobile Device 310 to Second Mobile Device 350. An exemplary breakdown of metadata for SMS Message 410 is shown, consisting of various portions such as the SCA, the TP-MR, the TP-DA, the TP-DCS, the TP-UDL, and the TP-UD. SMS Message 410 also includes TP-PID 412, which can be modified to indicate a length of the first duration of time. For example, SMSC 330 modifies an SMS message from First Mobile Device 310 to Second Mobile Device 350. SMSC 330 ascribes to the SMS message a first message modification attribute value, which may be a TP-PID value. A TP-PID value consists of eight bits. A TP-PID value corresponds to a real number, which may be an indication of the length of the first duration of time in minutes. In some implementations, the TP-PID value is symbolic of one of a set of standard time lengths. In some implementations, the TP-PID value can also indicate to end the first duration of time, for example in response to detecting that First Mobile Device 310 becomes eligible for instant messaging communications. An SMS message like SMS message 410 can also be sent from Second Mobile Device 350 to First Mobile Device 310.

TP-PID 412 consists of two segments Segment 414 and Segment 416. Both segments contain 4 bits. Segment 414 may indicate a communication channel on which to contact First Mobile Device 310, or the transmitting device of the SMS message. In some implementations, Segment 414 can take one of multiple possible values, and each of the values indicates a different communication channel or collection of communication channels to use for contacting the transmitting device for SMS message 410. Segment 416 indicates a length of time for the first duration, either through a literal representation of its real number, or through its correspondence to a preset standard length of time.

Computer System

Figure 5:
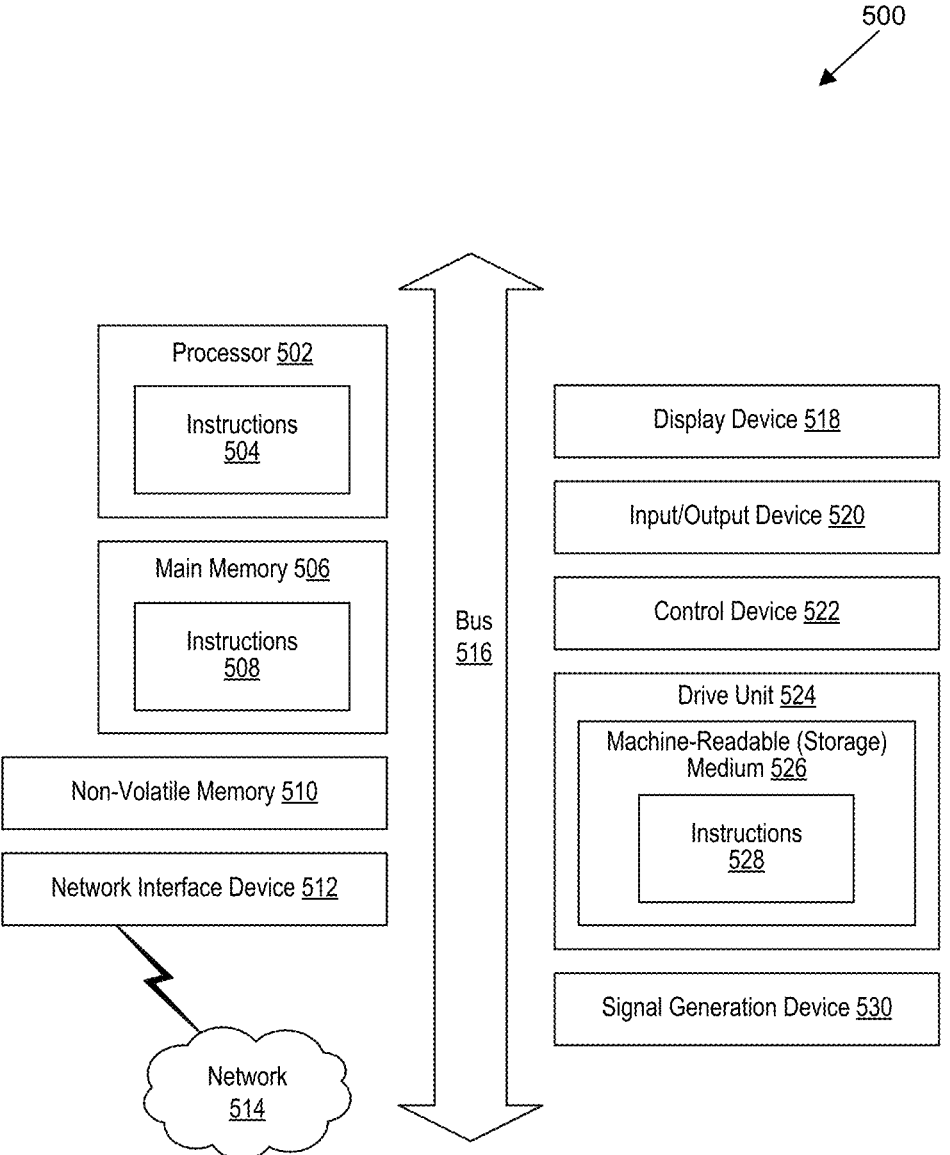
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 525 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 515 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 505, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A node in a telecommunications service for tagging messages comprising a non-transitory computer-readable medium having instructions stored thereon, which when executed by one or more processors of the node cause the node to:
   receive a request to deliver a first message from a first user device to a second user device on a first line of communication, wherein the first line of communication comprises instant messaging;
   determine that the first user device is eligible to receive SMS communication but not instant messaging communication;
   determine a message modification attribute value for the first message, wherein the message modification attribute value indicates a first duration of time to use SMS communication on the first line of communication;
   modify the first message using the message modification attribute value;
   deliver the modified first message as an SMS message to the second user device using the first line of communication;
   based on the message modification attribute value, cause the second user device to use SMS communication on the first line of communication, wherein the second user device is instructed by the modified first message to use SMS communication for a period of time; and
   receive a request to deliver a second message from the second user device in response to the first message, wherein the second message is an SMS message.

2. The node of claim 1, wherein a length of the first duration of time is determined based on a user profile for the first user device indicating a user preference associated with the first user device.

3. The node of claim 1, wherein a length of the first duration of time is determined based on a user profile for the second user device indicating a user preference associated with the second user device.

4. The node of claim 1, wherein a length of the first duration of time is determined based on a location of the first user device when requesting to deliver the first message.

5. The node of claim 1, wherein the node:
   receives, from a first user device, a request to deliver an instant message; and
   transmits a notification to the second user device indicating that the first line of communication is reverting to instant messaging communication.

6. At least one computer-readable medium, excluding transitory signals and storing instructions, which when executed by an electronic server, perform operations for operating the electronic server, the operations comprising:

receiving a request to deliver a first message from a first mobile device to a second mobile device on a first line of communication, wherein the first line of communication comprises an instant messaging network;

determining that the first mobile device is eligible to receive SMS communication but not instant messaging communication;

determining a message modification attribute value for the first message, wherein the message modification attribute value indicates to use SMS communication on the first line of communication;

modifying the first message using the message modification attribute value;

delivering the modified first message as an SMS message to the second mobile device using the first line of communication;

based on the message modification attribute value, causing the second mobile device to use SMS communication on the first line of communication, wherein the second mobile device is instructed by the modified first message to use SMS communication for a period of time; and receiving a request to deliver a second message from the second mobile device in response to the first message, wherein the second message is an SMS message.

7. The at least one computer-readable medium of claim 6, wherein the message modification attribute value is a TP-PID value indicating a first duration of time in which to use SMS communication on the first line of communication.

8. The at least one computer-readable medium of claim 7, wherein a length of the first duration of time is determined based on a user profile for the first mobile device indicating a user preference associated with the first mobile device.

9. The at least one computer-readable medium of claim 7, wherein a length of the first duration of time is determined based on a messaging history between the first mobile device and the second mobile device.

10. The at least one computer-readable medium of claim 7, wherein a length of the first duration of time is determined based on a machine learning model processing the first line of communication and first metadata associated with recent communications between the first mobile device and the second mobile device.

11. A method for tagging instant messages in a telecommunications network, comprising:

receiving, at a node of the telecommunications network, a request to deliver a first message from a first mobile device to a second mobile device on a first line of communication, wherein the first line of communication comprises instant messaging;

determining that the first mobile device is eligible to receive SMS communication but not instant messaging communication;

determining a message modification attribute value for the first message, wherein the message modification attribute value indicates to use SMS communication on the first line of communication;

modifying the first message using the determined message modification attribute value;

delivering the modified first message as a SMS message to the second mobile device using the first line of communication;

based on the message modification attribute value, causing the second mobile device to use SMS communication on the first line of communication, wherein the second mobile device is instructed by the modified first message to use SMS communication for a period of time; and receiving a request to deliver a second message from the second mobile device in response to the first message, wherein the second message is an SMS message.

12. The method of claim 11, further comprising:

detecting a connection of the first mobile device to a mobile data network; and transmitting a notification to the second mobile device indicating that the first line of communication is reverting to instant messaging communication.

13. The method of claim 11, wherein the message modification attribute value is a TP-PID value indicating a first duration of time in which to use SMS communication on the first line of communication.

14. The method of claim 13, further comprising:

using a mobile application on the second mobile device and the message modification attribute value, cause the second mobile device to store in memory the first duration of time; and causing the second mobile device to send only SMS messages on the first line of communication for the first duration of time.

15. The method of claim 13, wherein a length of the first duration of time is determined based on a user profile for the first mobile device indicating a user preference associated with the first mobile device.

16. The method of claim 13, wherein a length of the first duration of time is determined based on a user profile for the second mobile device indicating a user preference associated with the second mobile device.

17. The method of claim 13, wherein a length of the first duration of time is determined based on a location of the first mobile device when requesting to deliver the first message.

18. The method of claim 13, wherein a length of the first duration of time is determined based on a messaging history between the first mobile device and the second mobile device.

19. The method of claim 13, wherein a length of the first duration of time is determined based on a machine learning model processing the first line of communication and first metadata associated with recent communications between the first mobile device and the second mobile device.

20. The method of claim 12, further comprising:

receiving, from a first mobile device, a request to deliver an instant message; and transmitting a notification to the second mobile device indicating that the first line of communication is reverting to instant messaging communication.

* * * * *